United States Patent [19]

Hongo

[11] Patent Number: 5,375,016
[45] Date of Patent: Dec. 20, 1994

[54] CONCAVE MIRROR

[75] Inventor: Hidehisa Hongo, Tokorozawa, Japan

[73] Assignee: Hitachi Denshi Kabushiki Kaisha, Tokyo, Japan

[21] Appl. No.: 480,024

[22] Filed: Feb. 14, 1990

[30] Foreign Application Priority Data

Feb. 20, 1989 [JP] Japan .................. 1-17898[U]

[51] Int. Cl.⁵ .................................. G02B 5/10
[52] U.S. Cl. ........................ 359/853; 359/850
[58] Field of Search ................. 350/600–630, 350/638, 103–109, 420, 432, 320; 74/457; 126/435–440, 449, 680–697; 359/838–871

[56] References Cited

U.S. PATENT DOCUMENTS

| | | | |
|---|---|---|---|
| 3,645,606 | 2/1972 | La Vantine | 350/613 |
| 3,923,382 | 12/1975 | Harding | 359/853 |
| 4,035,064 | 7/1977 | Gowman, Jr. et al. | 350/608 |
| 4,038,971 | 8/1977 | Bezborodko | 359/852 |
| 4,153,929 | 5/1979 | Laudenschlarger et al. | 359/851 |
| 4,155,631 | 5/1979 | Borsare et al. | 359/847 |
| 4,161,942 | 7/1979 | Monk | 350/613 |
| 4,195,913 | 4/1980 | Dourte et al. | 359/853 |
| 4,395,581 | 7/1983 | Girard | 350/613 |
| 4,466,700 | 8/1984 | Christiansen et al. | 359/848 |
| 4,583,520 | 4/1986 | Dietrich et al. | 126/438 |
| 4,616,909 | 10/1986 | Dane | 359/853 |
| 4,656,996 | 4/1987 | Aharon | 350/613 |
| 4,678,293 | 7/1987 | Jacques | 350/609 |
| 4,682,865 | 7/1987 | Rogers et al. | 350/613 |
| 4,696,554 | 9/1987 | Seawright | 350/611 |
| 4,845,511 | 7/1989 | Grayson et al. | 350/613 |
| 4,919,527 | 4/1990 | Saiylov et al. | 126/438 |

FOREIGN PATENT DOCUMENTS

| | | | |
|---|---|---|---|
| 2012065 | 7/1979 | European Pat. Off. | 359/851 |
| 3418879 | 2/1986 | Germany | 350/608 |
| 63-172862 | 7/1988 | Japan . | |
| 1399693 | 5/1988 | U.S.S.R. | 350/613 |
| 81/01214 | 4/1981 | WIPO . | |

Primary Examiner—Scott J. Sugarman
Assistant Examiner—Thong Nguyen
Attorney, Agent, or Firm—Antonelli, Terry, Stout & Kraus

[57] ABSTRACT

A large-size spherical concave mirror, comprises a plurality of small-size concave mirrors joined together to constitute the large-size spherical concave mirror. Each of the small-size concave mirrors includes a concave mirror surface and at least three joining surfaces extending from the concave mirror surface, the small-size concave mirrors adjacent to each other being joined together through the joining surfaces, each of the joining surfaces and a spherical center of the large-size spherical concave mirror being disposed on a respective plane so that the joining surfaces do not face to the spherical center of the large-size spherical concave mirror.

16 Claims, 3 Drawing Sheets

CONCAVE MIRROR

BACKGROUND OF THE INVENTION AND RELATED ART STATEMENT

The present invention relates to a concave mirror, and more particularly relates to a concave mirror which magnifies an original picture projected on a screen or generated by a cathode-ray tube and which projects the magnified picture on another screen arranged at a long distance from the concave mirror, in a projector for a flight simulator and so forth.

In the projector for the flight simulator, a ship-maneuvering simulator and so forth, the screen or the cathode-ray tube for the original picture is generally set in the vicinity of a focus of the concave mirror so that the original picture on the screen or the cathode-ray tube is magnified on the other screen arranged at a long distance from the concave mirror. In this case, it is necessary for a size of the concave mirror to be large.

A kind of the large-size concave mirror is composed of a plurality of small-size concave glass mirrors joined together. Another kind of the large-size concave mirror is a thin mirror sheet whose periphery is fixed and whose mirror surface is deformed by a vacuum to form a concave mirror surface, the degree of which vacuum is controlled in accordance with a measured shape of the concave mirror surface to maintain a predetermined concave shape of the mirror surface. When the large-size concave mirror is composed of the plurality of small-size concave glass mirrors, it is necessary for each of the small-size concave glass mirrors to have a chamfer between the mirror surface and each of the joining surfaces of the glass mirrors and a weight of concave mirror is great. And when the small-size concave glass mirrors are not correctly fixed in a radial direction extending from a focus of the large-size concave mirror toward a mirror surface of the large-size concave mirror, the mirror surface is not made smooth by joining lines between the small-size concave glass mirrors. When the large-size concave mirror is the thin mirror sheet, the predetermined concave shape of the mirror surface can not be maintained, because the concave mirror surface is vibrated by a vibration of the simulator during operation thereof. Therefore, in the conventional projectors, the magnified and projected picture is disturbed by the joining lines between the small-size concave glass mirrors or by the vibrating concave mirror surface.

OBJECT AND SUMMARY OF THE INVENTION

An object of the present invention is to provide a large-size concave mirror in which the disturbance of a magnified and projected picture caused by the joining lines between the small-size concave mirrors is very small and the thin mirror sheet is not used.

A large-size concave mirror according to the present invention, comprises a plurality of small-size concave mirrors joined together to constitute a large-size spherical concave mirror, each of the small-size concave mirrors including a concave mirror surface and at least three joining surfaces extending from the concave mirror surface, the small-size concave mirrors adjacent to each other being joined together through the joining surfaces, each of the joining surfaces and a spherical center of the large-size spherical concave mirror being on one plane so that the joining surfaces do not face to the spherical center of the large-size spherical concave mirror.

Since the joining surfaces extend from the concave mirror surface, the small-size concave mirrors adjacent to each other are joined together through the joining surfaces and each of the joining surfaces and the spherical center of the large-size spherical concave mirror are on one plane, the joining surfaces do not face to the spherical center of the large-size concave mirror, and an amount of light beams which extend from the vicinity of the spherical center of the large-size spherical concave mirror, reflect on the joining surfaces and are disturbed by the joining surface is very small. Therefore, the disturbance of the magnified and projected picture caused by the joining lines formed along the joining surfaces is very small.

DETAILED DESCRIPTION OF PREFERRED EMBODIMENTS

Figure 1:
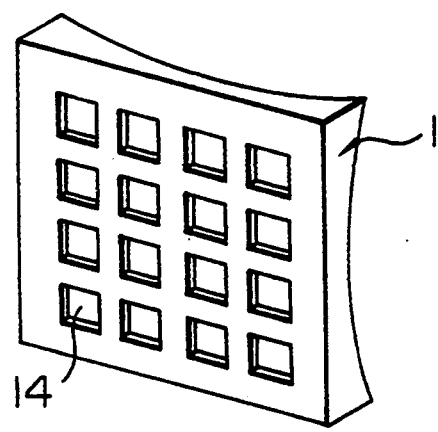
FIG. 1 is an oblique projection view showing a small-size concave mirror of an embodiment according to the present invention.

As shown in FIG. 1, a small-size concave mirror 1 of an embodiment according to the present invention has a concave mirror surface, a back surface and four joining surface extending between the concave mirror surface and the back surface. The back surface has many dents 14 so that the weight of the small-size concave mirror is decreased.

Figure 2:
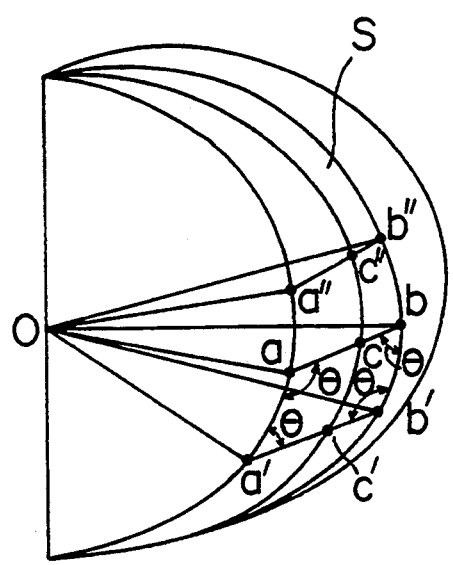
FIG. 2 is a schematic view showing a structural relation between a large-size spherical concave mirror and joining surfaces of the small-size concave mirrors of FIG. 1.

As shown in FIG. 2, in each of the small-size concave mirrors 1, a first one of the four joining surfaces and a spherical center 0 of a large-size spherical concave mirror composed of the small-size concave mirrors 1 are on a plane, for example, 0a'a, a second one of the four joining surfaces and the spherical center 0 are on a plane, for example, 0b'b, a third one of the four joining surfaces and the spherical center 0 are on a plane, for example, 0ab and a fourth one of the four joining surfaces and the spherical center 0 are on a plane, for example, 0a'b', so that each of the four joining surfaces and the spherical center 0 of the large-size spherical concave mirror are on one plane. A mirror surface of the large-size spherical concave mirror is denoted by S in FIG. 2 and is substantially a part of a spherical or globular shape. The third one of the four joining surfaces and the fourth one of the four joining surfaces extend perpendicularly to a central plane 0c'c dividing equally a space between the first one of the four joining surfaces and the second one of the four joining surfaces in each of the small-size concave mirrors so that the angles a0c and c0b are equal to each other and the shapes of the small-size concave mirror 1 adjacent to each other in the horizontal direction are equal to each other, the third one of the four joining surfaces and the fourth one of the four joining surfaces extend substantially or nearly perpendicularly to the first one of the four joining surfaces and to the second one of the four joining surfaces so that adjacent joining surfaces are substantially perpendicular to each other and angles $\theta$ between the joining surfaces crossing each other are not very acute and are substantially 90°, so that it is not necessary for large chamfers to be arranged between the joining surfaces crossing each other in each of the small-size concave mirrors. Therefore, the mirror surface of the large-size spherical concave mirror is not disturbed by the large chamfers between the joining surfaces crossing each other.

Figure 3:
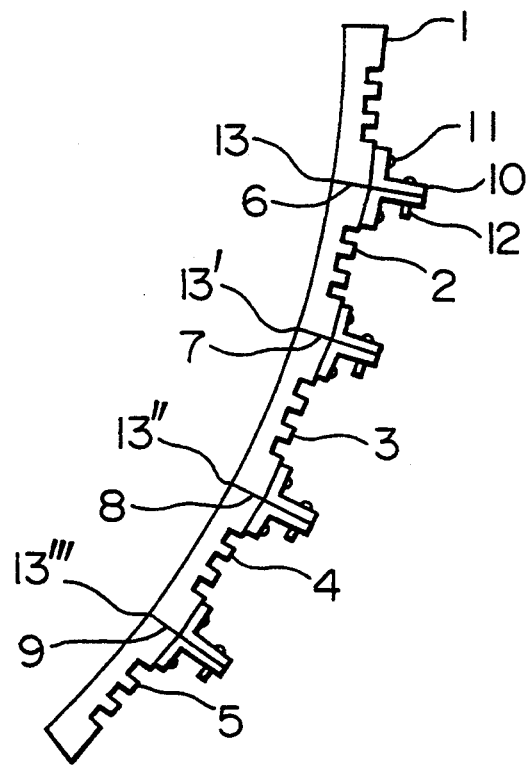
FIG. 3 is a plan view showing the small-size concave mirrors of FIG. 1 joined together through the joining surfaces.
Figure 4:
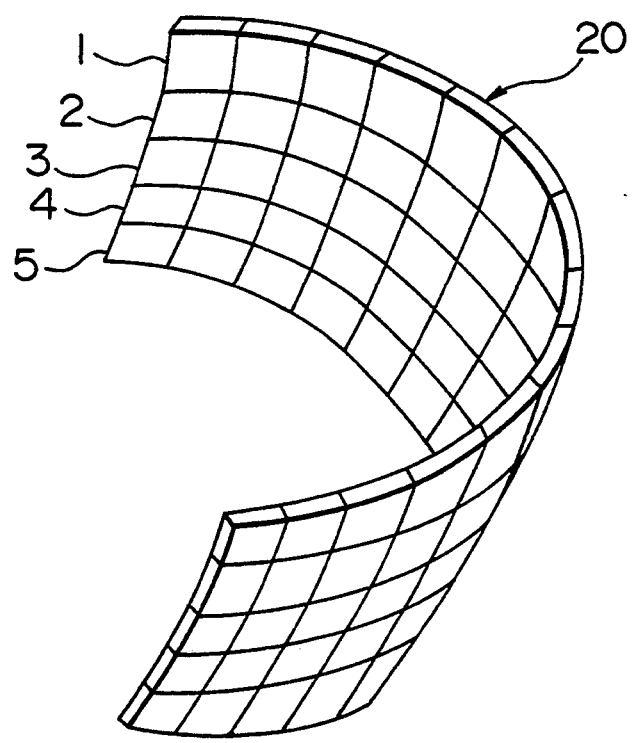
FIG. 4 is an oblique projection view showing schematically a large-size spherical concave mirror composed of the small-size concave mirrors of FIG. 1.

The small-size concave mirrors 1 to 5 are joined together through the joining surfaces 6 to 9 and through joining members 10, as shown in FIG. 3. The joining members 10 are fixed on the small-size concave mirrors 1 to 5 by screws 11 respectively and are joined by screws 12, so that the small-size concave mirrors 1 to 5 are joined together to constitute the large-size spherical concave mirror 20 as shown in FIG. 4.

The small-size concave mirrors according to the present invention are made of a metal or preferably of a light metal. Since metals have a greater toughness than glass, it is not necessary for each of the small-size concave mirrors to have a chamfer for preventing a break of the mirrors between the mirror surface and the joining surfaces. Therefore, the disturbance of magnified and projected picture caused by the chamfer is very small.

Figure 5:
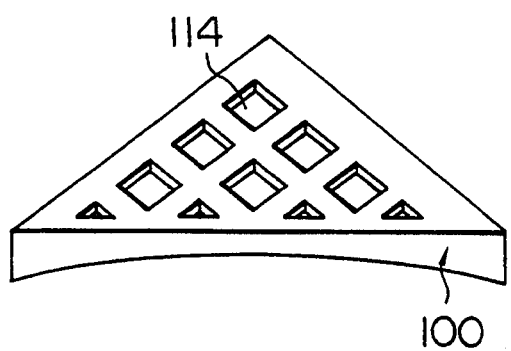
FIG. 5 is an oblique projection view showing a small-size concave mirror of another embodiment according to the present invention.

As shown in FIG. 5, a small-size concave mirror 100 of another embodiment according to the present invention has a concave mirror surface, a back surface and three joining surface extending between the concave mirror surface and the back surface. Each of the small-size concave mirrors constituting the large-size concave mirror may have at least three joining surfaces. The back surface has many dents 114 so that the weight of the small-size concave mirror is decreased.

Figure 6:
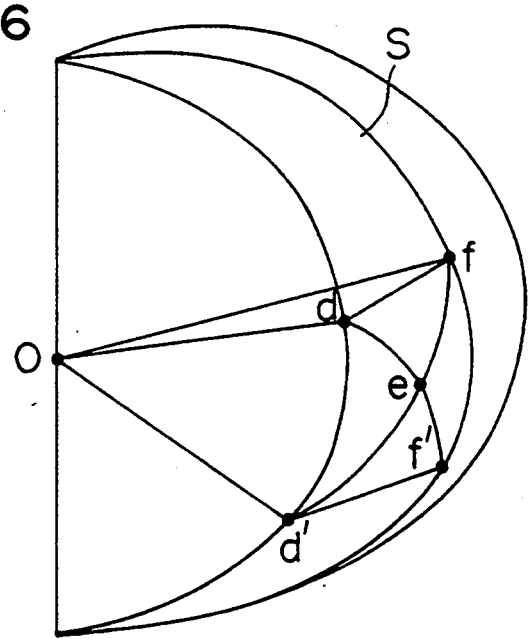
FIG. 6 is a schematic view showing a structural relation between the large-size spherical concave mirror and joining surfaces of the small-size concave mirrors of FIG. 5.

As shown in FIG. 6, in each of the small-size concave mirrors 100, a first one of the three joining surfaces and a spherical center 0 of a large-size concave mirror composed of the small-size concave mirrors 100 are on a plane, for example, 0d'd, a second one of the three joining surfaces and the spherical center 0 are on a plane, for example, 0de, and a third one of the three joining surfaces and the spherical center 0 are on a plane, for example, 0d'e, so that each of the three joining surfaces and the spherical center 0 of the large-size concave mirror are on one plane. A mirror surface of the large-size concave mirror is denoted by S in FIG. 6 and is substantially a part of a spherical or globular shape.

Figure 7:
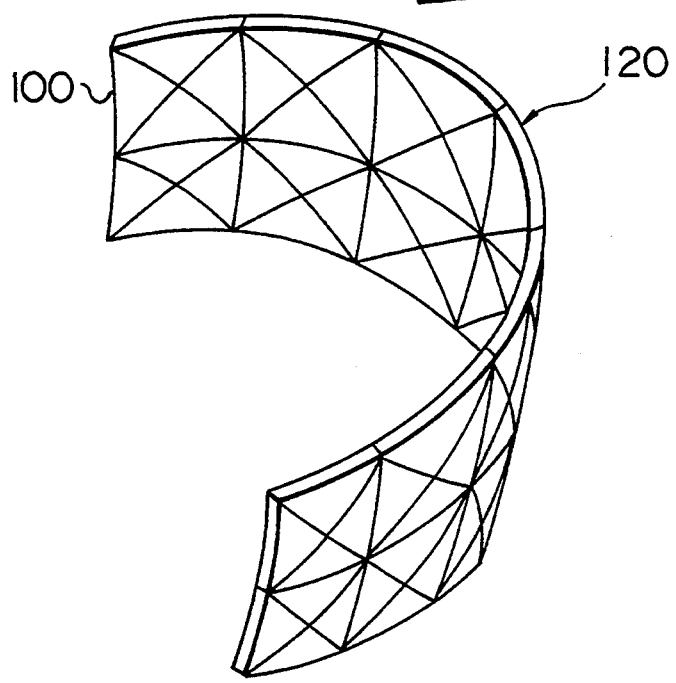
FIG. 7 is an oblique projection view showing schematically a large-size spherical concave mirror composed of the small-size concave mirrors of FIG. 5.

The small-size concave mirrors 100 are joined together through the joining surfaces and through the joining members 10 in a manner similar to the manner shown in FIG. 3, so that the small-size concave mirrors 100 constitute the large-size spherical concave mirror 120 as shown in FIG. 7.

What is claimed is:

1. A large-size spherical concave mirror comprising a plurality of small-size concave mirrors joined together to constitute the large-size spherical concave mirror, each of the small-size concave mirrors including a concave mirror surface and at least three joining surfaces extending from the concave mirror surface, the small-size concave mirrors adjacent to each other being joined together through direct contact of respective joining surfaces, each of the joining surfaces and a spherical center of the large-size spherical concave mirror being disposed on a respective plane, wherein each of the small-size concave mirrors has a front face with the concave mirror surface and a back face with a plurality of dents thereon.

2. A large-size spherical concave mirror according to claim 1, wherein the small-size concave mirrors are joined together through direct contact of respective joining surfaces so as to form a substantially smooth curved surface of the large-size spherical concave mirror, thereby enabling the large-size spherical concave mirror to magnify and project a picture with substantially no disturbance due to the respective joining surfaces.

3. A large-size spherical concave mirror, comprising a plurality of small-size concave mirrors joined together to constitute the large-size spherical concave mirror, each of the small-size concave mirrors including a concave mirror surface and at least three joining surfaces extending from the concave mirror surface, the small-size concave mirrors adjacent to each other being joined together through contact of respective joining surfaces, and each of the small-size concave mirrors having a front face with the concave mirror surface and a back face with at least one dent thereon, wherein the back surface of at least one of the small-size concave mirrors includes a plurality of dents thereon.

4. A large-size spherical concave mirror according to claim 3, wherein the small-size concave mirrors are made of metal.

5. A large-size spherical concave mirror according to claim 3, wherein the number of joining surfaces included by each of the small-size concave mirrors is four, a first one of the four joining surfaces and a second one of the four joining surfaces do not cross each other in each of the small-size concave mirrors, a third one of the four joining surfaces and a fourth one of the four joining surfaces do not cross each other in each of the small-size concave mirrors, the third one of the four joining surfaces and the fourth one of the four joining surfaces extend perpendicularly to a central plane dividing equally a space between the first one of the four joining surfaces and the second one of the joining surfaces in each of the small-size concave mirrors.

6. A large-size spherical concave mirror according to claim 3, wherein the small-size concave mirrors are joined together with joining members.

7. A large-size spherical concave mirror according to claim 3, wherein each of the small-size concave mirrors has a back surface with a plurality of dents thereon.

8. A large-size spherical concave mirror according to claim 3, wherein the small-size concave mirrors are joined together through contact of respective joining surfaces so as to form a substantially smooth curved surface of the large-size spherical concave mirror, thereby enabling the large-size spherical concave mirror to magnify and project a picture with substantially no disturbance due to the respective joining surfaces.

9. A large-size spherical concave mirror according to claim 3, wherein each of the joining surfaces of the small-size concave mirrors and a spherical center of the large-size spherical concave mirror are disposed on a respective plane.

10. A large-scale spherical concave mirror comprising a plurality of small-size concave mirrors joined together to constitute the large-size spherical concave mirror, each of the small-size concave mirrors including a concave mirror surface and least three joining surfaces extending from the concave mirror surface, the small-size concave mirrors adjacent to each other being joined together through contact of respective joining surfaces, and each of the small-size concave mirrors having a front face with the concave mirror surface and a back face with at least one dent thereon, wherein the small-size concave mirrors adjacent to each other are joined together through direct contact of respective joining surfaces.

11. A large-size spherical concave mirror comprising a plurality of small-size concave mirrors joined together to constitute the large-size spherical concave mirror, each of the small-size concave mirrors including a concave mirror surface and at least three joining surfaces extending from the concave mirror surface, the small-size concave mirrors adjacent to each other being joined together through contact of respective joining surfaces, and each of the small-size concave mirrors having a front face with the concave mirror surface and a back face with at least one dent thereon, wherein the at least one dent is a non-threaded recess for reducing the weight of each of the small-size concave mirrors.

12. A large-size spherical concave mirror comprising a plurality of small-size concave mirrors joined together to constitute the large-size spherical concave mirror, each of the small-size concave mirrors including a concave mirror surface and at least three joining surfaces extending from the concave mirror surface, the small-size concave mirrors adjacent to each other being joined together through direct contact of respective joining surfaces, each of the joining surfaces of the small-size concave mirrors and a spherical center of the large-size spherical concave mirror being disposed on a respective plane, wherein the back surface of at least one of the small-size concave mirrors includes a plurality of dents thereon.

13. A large-size spherical concave mirror according to claim 12, wherein the small-size concave mirrors are made of metal.

14. A large-size spherical concave mirror according to claim 12, wherein the number of joining surfaces included by each of the small-size concave mirrors is four, a first one of the four joining surfaces and a second one of the four joining surfaces do not cross each other in each of the small-size concave mirrors, a third one of the four joining surfaces and a fourth one of the four joining surfaces do not cross each other in each of the small-size concave mirrors, the third one of the four joining surfaces and the fourth one of the four joining surfaces extend perpendicularly to a central plane dividing equally a space between the first one of the four joining surfaces and the second one of the four joining surfaces in each of the small-size concave mirrors.

15. A large-size spherical concave mirror according to claim 12, wherein the small-size concave mirrors are joined together with joining members.

16. A large-size spherical concave mirror according to claim 12, wherein the small-size concave mirrors are joined together through contact of respective joining surfaces so as to form a substantially smooth curved surface of the large-size spherical concave mirror, thereby enabling the large-size spherical concave mirror to magnify and project a picture with substantially no disturbance due to the respective joining surfaces.

* * * * *